United States Patent
Bifano et al.

(10) Patent No.: US 7,356,348 B2
(45) Date of Patent: Apr. 8, 2008

(54) METHOD AND APPARATUS FOR PROVIDING TELECOMMUNICATIONS OVER A CABLE NETWORK EMPLOYING A WIRELESS COMMUNICATION PATH AS AN ALTERNATIVE BACKUP PATH

(75) Inventors: Louis Dominick Bifano, Morrisville, PA (US); Rick Dziekan, North Wales, PA (US)

(73) Assignee: General Instrument Corporation, Horsham, PA (US)

( * ) Notice: Subject to any disclaimer, the term of this patent is extended or adjusted under 35 U.S.C. 154(b) by 510 days.

(21) Appl. No.: 10/322,364

(22) Filed: Dec. 18, 2002
(Under 37 CFR 1.47)

(65) Prior Publication Data
US 2004/0121726 A1  Jun. 24, 2004

(51) Int. Cl.
*H04M 1/00* (2006.01)
*H04Q 7/20* (2006.01)
*H04J 1/00* (2006.01)

(52) U.S. Cl. .................... 455/552.1; 455/426.2; 455/550.1; 370/489

(58) Field of Classification Search ........ 455/426.2, 455/554.1, 426.1, 550.1, 445, 552.1, 556.1; 370/489
See application file for complete search history.

(56) References Cited

U.S. PATENT DOCUMENTS

| 5,675,629 | A | * | 10/1997 | Raffel et al. ............. 455/552.1 |
| 5,751,789 | A | * | 5/1998 | Farris et al. ............. 379/32.04 |
| 5,790,631 | A | * | 8/1998 | Minarczik et al. ............. 379/2 |
| 5,809,395 | A | * | 9/1998 | Hamilton-Piercy et al. . 725/106 |
| 5,842,122 | A | * | 11/1998 | Schellinger et al. ........ 455/403 |
| 6,246,750 | B1 | * | 6/2001 | Ehreth ....................... 379/56.2 |
| 6,373,817 | B1 | * | 4/2002 | Kung et al. ................. 370/217 |
| 6,690,768 | B2 | * | 2/2004 | Hansen ...................... 379/1.03 |
| 6,876,852 | B1 | * | 4/2005 | Li et al. ................... 455/426.2 |

\* cited by examiner

*Primary Examiner*—Tilahun Gesesse
(74) *Attorney, Agent, or Firm*—Larry T. Cullen (57) ABSTRACT

A cable telephony network for providing a communications path connecting a first device and a second device. The communications path is selectable between a first communications path and a second communications path. The network comprises a broadband cable system, providing the first communications path and a wireless telephone network, providing the second communications path.

21 Claims, 8 Drawing Sheets

METHOD AND APPARATUS FOR PROVIDING TELECOMMUNICATIONS OVER A CABLE NETWORK EMPLOYING A WIRELESS COMMUNICATION PATH AS AN ALTERNATIVE BACKUP PATH

BACKGROUND OF THE INVENTION

1. Field of the Invention

The present invention relates generally to telephonic communications and more particularly to a cable-based telephony network providing a backup wireless communications path.

2. Background Information

Figure 8:
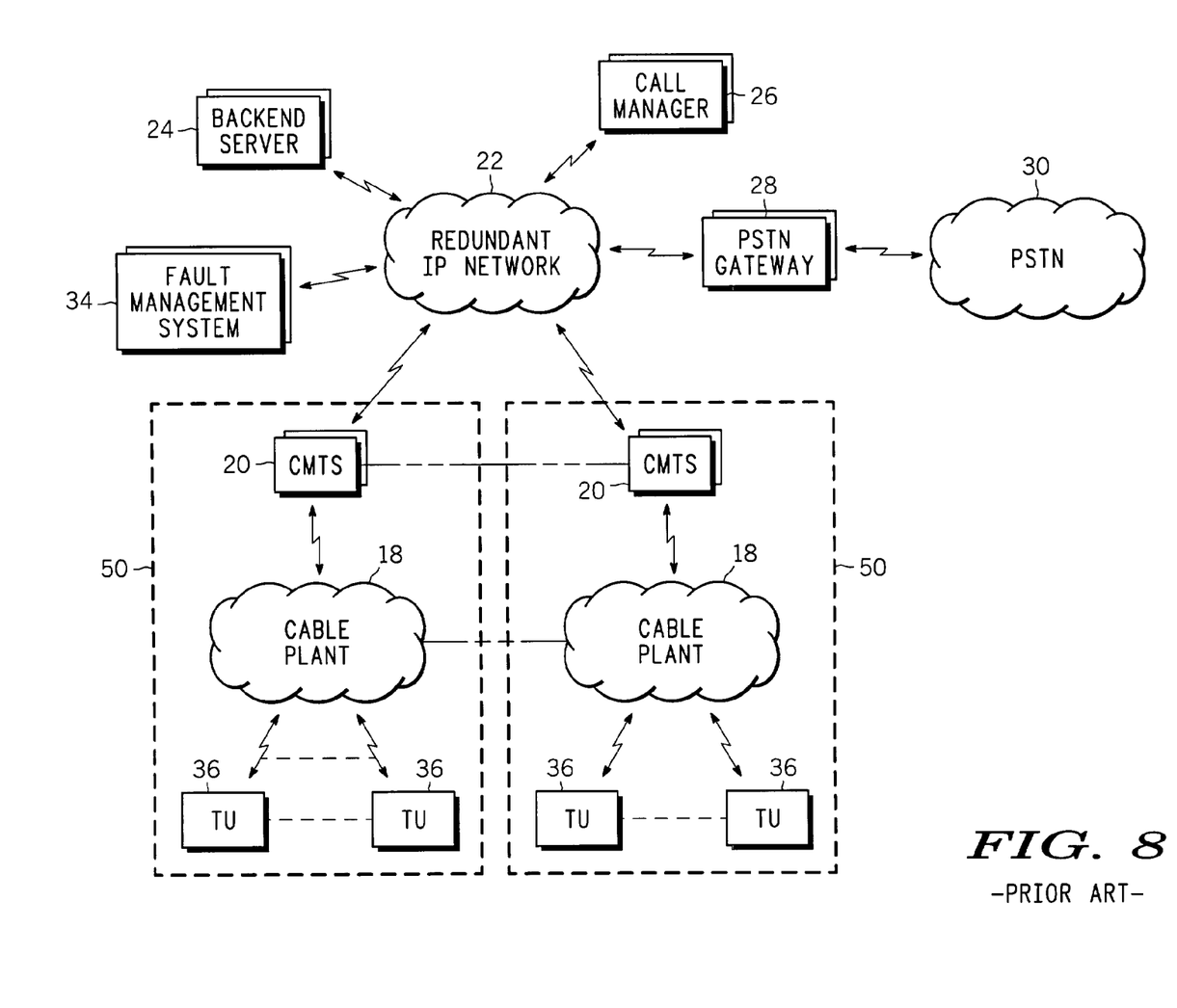
FIG. 8 is a functional block diagram of a known telephone system for providing a cable based telephone connection between a first telephone and a second telephone utilizing redundant components to achieve high availability.

FIG. 8 shows the basic architecture of a cable telephony network 10 providing cable-based telephone service.

The cable telephony network 10 typically includes one or more cable plants 18. Typically, each cable plant 18 comprises a broadband bi-directional, shared media, signal transmission system employing fiber optic trunks between a central signal distribution point known as a head-end or headend, and fiber nodes located in a neighborhood of customers of the cable network 10. Typically, coaxial cable is employed for distributing signals between the fiber nodes and equipment installed in the customer premises (generally referred to as customer premises equipment (CPE)).

The customer premises equipment used with the cable telephony network 10 typically comprises a terminal unit 36 for providing access by a telephone (not shown) to the cable telephony network 10 by a telephone (not shown). Each terminal unit 36 generally includes a cable modem (not shown), which electrically interfaces the terminal unit 36 to the cable plant 18. Each terminal unit 36 also typically includes a multimedia terminal adapter (not shown) which electrically interfaces the terminal unit 36 to the telephone or to a telephone like device.

The cable telephony network 10 also includes one or more cable modem termination systems 20 located at the head-end of each cable plant 18. The cable modem termination system 20 ensures that all terminal units 36 connected to the cable plant 18 are synchronized and have fair access to the cable telephony network 10. The signal modulation and the communication protocols used by cable modem termination system 20 and the terminal units 36 for communicating via the cable plant 18 typically conform to the standard Data-Over-Cable Service Interface Specification (DOCSIS) Radio Frequency Interface Specification, and utilize the standard Media Access Control (MAC) protocols. The combination of the cable plant 18 and the cable modem termination system 20 is typically referred to as a broadband cable system 50.

The cable telephony network 10 also typically includes an Internet Protocol (IP) network 22 and a PSTN gateway 30. Typically, the IP protocol network 22 is a private computer network using the known Internet Protocol. Telephone traffic between the customers of the cable telephony network 10 and customers of a public switched telephone network 30 typically flows via the cable modem termination system 20, the IP network 22 and the PSTN gateway 30. The cable modem termination system 20 and the PSTN gateway 28 perform the conversions of signaling and bearer traffic (call contents) for interfacing the IP network 22 to the cable plant 18 and to the public switched telephone network 30.

Typically, cable-based telephone service is supported by one or more computer based systems attached to the IP network 22. Such supporting computer systems typically include one or more call manager host computers 26 (i.e., call managers). Typically, each call manager 26 is associated with an assigned telephone office and provides for initiating, processing and forwarding call signaling information for telephone calls originating in that office. The cable-based telephone service is also typically supported by backend server host computers 24 which perform administrative tasks such as customer billing, and fault management host computers 34 which provide for control and management of various components (e.g., cable plant 18, cable modem termination system 20, etc.) of the cable telephony network 10.

To be competitive with telephony service offered by the public switched telephone network 30, the quality of a cable-based telephony service must be equivalent to that offered by the public switched telephone network 30. To that end, present day cable-based telephony networks 10 utilize redundant components in both the cable plant 18 and in the aforementioned support systems attached to the IP network 22, to provide high availability cable-based telephone service to the customers of the cable telephony network 10. In particular, the cable modem termination system 20, the back end server host computers 24, the fault management host computers 34, the call manager host computers 26, and the PSTN gateway host computers 28 are typically made redundant so that a failure of a single computer in one of the aforementioned systems does not render the cable-based telephony service to be degraded. The redundant components add extra cost and complexity to the cable telephony network 10. Many of the redundant components operate in a standby or passive mode until a failure occurs and consequently provide no benefit to a broadband cable customer of the cable telephony network 10 until the failure occurs.

In addition to providing redundant computer systems, each cable plant 18 typically includes a plurality of cable monitoring devices (not shown), generally known as a broadband test points, at selected points in the cable plant 18, to enhance the availability of the cable-based telephone service. The broadband test points measure selected characteristics of the signals being distributed in the transmission media of the cable plant 18 in order to provide means for detecting faults in the cable plant 18 and for isolating the faults to various segments of the cable plant 18. Typically, the signal characteristics measured by the broadband test points are reported to the fault management host computers 34 via the transmission media of the cable plant 18. Consequently, a catastrophic failure within the cable plant 18 can prevent receipt by the fault management host computers 34 of the values of the signal characteristics which are required to diagnose and repair the fault in the cable plant 18, thus negatively impacting the speed in which the full performance of the cable telephony network 10 can be restored from the fault condition.

It would be desirable to provide high availability cable-based telephone service for customers of the cable telephony network without requiring an excessive number of redundant components in the cable telephony network 10. Further, it would be desirable to provide the high availability telephone service using existing communication capabilities. Also, it would be desirable to provide an alternate means of communications between the cable monitoring devices and the fault management host computers 34.

BRIEF SUMMARY OF THE INVENTION

Briefly stated the present invention comprises a cable telephony network for providing a communications path connecting a first device and second device. The communications path is selectable between a first communications path and a second communications path. The network comprises a broadband cable system, providing the first communications path and a wireless telephone network, providing the second communications path.

The present invention further comprises a cable telephony network for providing a connection between a first telephone and a second telephone. The connection is selectable between a first telephone connection and a second telephone connection. The network comprises a broadband cable system, providing the first connection and a wireless telephone network providing a second telephone connection.

The present invention also comprises a terminal unit for selectively connecting a telephone to a broadband cable system and to a wireless telephone network. The terminal unit comprises a broadband cable transceiver connecting the telephone to the broadband cable system and a wireless network transceiver connecting the telephone to the wireless telephone network.

The present invention also comprises a communications network for providing a communications path connecting a monitoring device and a fault monitoring system. The communications path is selectable between a first communications path and a second communications path. The network comprises a broadband cable system, providing the first communications path and a wireless telephone network, providing the second communications path.

The present invention also comprises a monitoring device for collecting and storing information about a broadband cable system and for communicating the information to a fault management system. The monitoring device comprises a broadband cable transceiver connecting the monitoring device to the broadband cable system and communicating the information to the fault management system via the broadband cable system and a wireless network transceiver connecting the monitoring device to a wireless telephone network and communicating the information to the fault management system via the wireless telephone network.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE PREFERRED EMBODIMENT(S)

In the drawings, like numerals are used to indicate like elements throughout the several figures. The use of the indefinite article "a" may indicate a quantity of one, or more than one, of an element.

Figure 1:
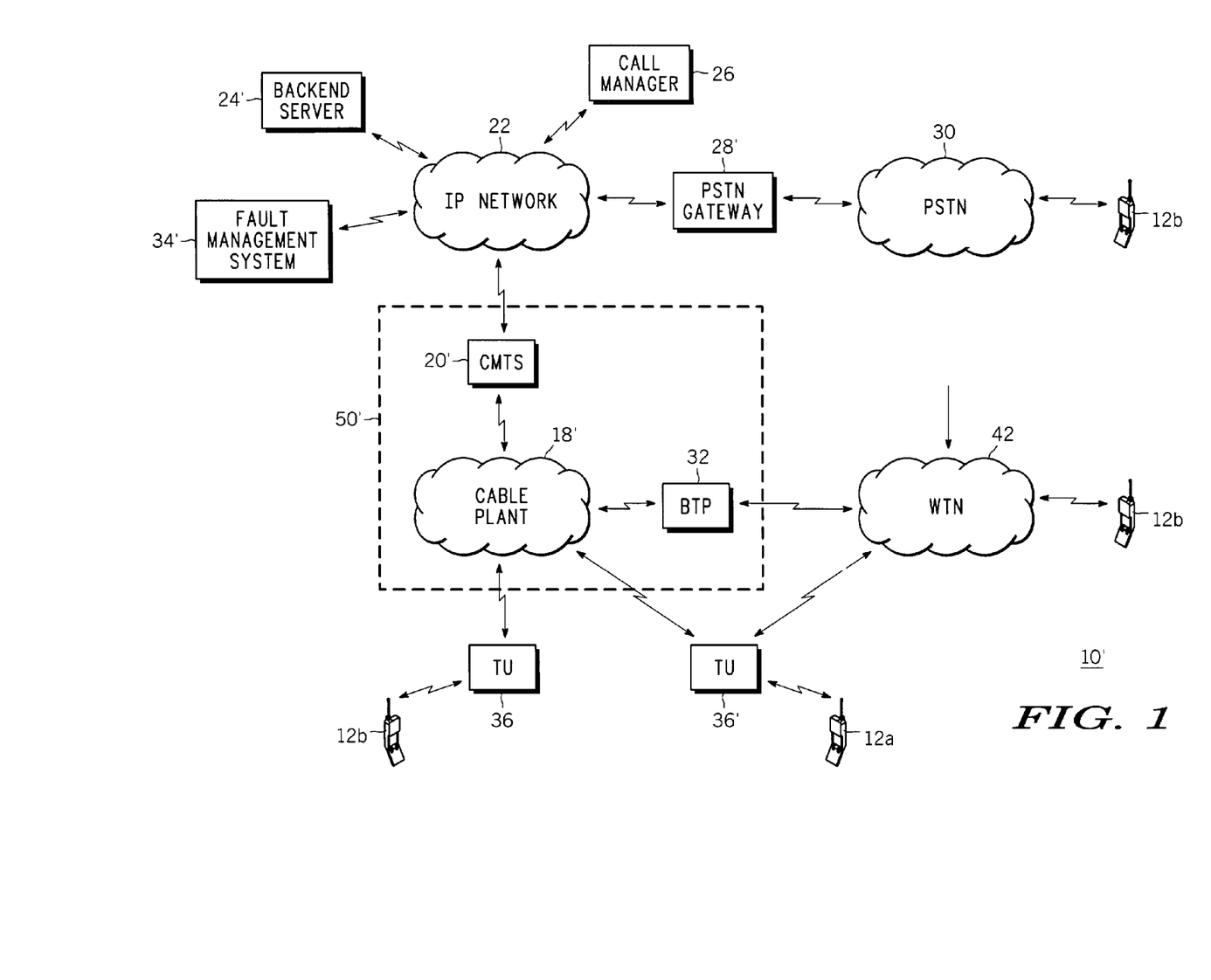
FIG. 1 is a functional block diagram of a telephone system for providing one of a first communications path and a second communications path between a first device and a second device according to the present invention.

FIG. 1 shows a cable telephony network 10' for providing a communications path connecting a first device and a second device. The communications path is selectable between a first communications path and a second communications path.

Preferably, the cable telephony network 10' comprises one or more broadband cable systems (BCS) 50' for providing the first communications path, and one or more wireless telephone networks (WTN) 42 for providing the second communications path.

In a first preferred embodiment of the present invention, the first device and the second device are each telephones 12a, 12b. A connection between the first telephone 12a and the second telephone 12b may be provided via either the BCS 50' or via the WTN 42, regardless of whether the connection is initiated by the first telephone 12a or by the second telephone 12b. However, if the connection between the first telephone 12a and the second telephone 12b is attempted via the BCS 50' and cannot be provided via BCS 50', the cable telephony network 10' automatically attempts to provide the connection via the WTN 42 as described below. Further, if the connection between the first telephone 12a and the second telephone 12b is lost having been first established via the BCS 50', the cable telephony network 10' provides the capability of establishing the lost connection via the WTN 42.

In the first preferred embodiment, each broadband cable system 50' includes a cable plant 18' which provides a network of shared transmission media in which a plurality of upstream and downstream signals between customers of the broadband cable system 50' and a head-end of the cable plant 18' are multiplexed onto a single transmission media. Preferably, each cable plant 18' is a hybrid fiber coax plant. However, other types of cable plants 18', such as all those using all coaxial cables, or a mixture of fiber, wireless and coaxial cable could also be used. Each broadband cable system 50' also includes a cable modem termination system (CMTS) 20'. The CMTS 20' ensures that terminal units 36' (discussed below) connected to the cable plant 18' remain synchronized with the BCS 50' and have fair access to the cable telephony network 10'. The structure and the operation of the cable plant 18' and the CMTS 20' are well known to those skilled in the art, and thus are not further described here, for the sake of brevity.

Preferably, the cable telephony network 10' also includes one or more terminal units 36', each of which connects one or more of the first telephones 12a used by customers of the cable telephony network 10' to the broadband cable system 50' and to the wireless telephone network 42. Preferably, each first telephone 12a is a conventional telephone using dual tone multiple frequency (DTMF) signaling. However, telephones using other types of signaling, such as pulse signaling, are within the sprit and scope of the invention.

In the first preferred embodiment, the second telephone 12*b* may be connected to: (1) a public switched telephone network (PSTN) 30; (2) a wireless telephone network such as the WTN 42; (3) the BCS 50'; (4) or to a different broadband cable system (not shown) by a conventional terminal unit 36. The conventional terminal unit 36 lacks the capability for connecting to the WTN 42 but is otherwise identical to the TU 36'. The second telephone 12*b* would be of a type compatible with the respective telephone system/network to which it is connected.

Preferably, the cable network 10' includes one or more call manager computer systems 26' (referred to hereafter as a call manager 26'), typically connected to an IP network 22. Preferably, the IP protocol network 22 is a private computer network using the known Internet Protocol. However, the IP network 22 could be a public IP network such as the Internet. Typically, each telephone 12*a*, 12*b* having a telephone number is assigned a call manager 26'. The assigned call manager 26' is assigned to the telephone 12*a*, 12*b* from which a telephone call originates. The call manager 26' creates, modifies and tears down the first and the second connections between the first telephone 12*a* and the second telephone 12*b*. In the first preferred embodiment, each call manager 26' includes a database which includes information about the operational status of each TU 36' assigned to the first telephones 12*a* connected to the TU 36', including whether each TU 36' is ranged and registered with the CMTS 20 and whether each TU 36' assigned to the cell agent 36' is able to communicate with the call manager 26' via the cable plant 18'.

Preferably, the cable telephony network 10' also includes a backend server computer system 24', typically connected to the IP network 22, for administrative tasks such as customer billing. The cable telephony network 10' further includes a PSTN gateway computer system 28' which connects the IP network 22 to the PSTN 30 and provides for the conversion of the signaling used within the IP network 22 to Signaling System Number 7 signaling, typically used within the PSTN 30. The composition and operation of the IP network 22, the backend server 24', the call manager 26', the PSTN gateway 28' and the PSTN 30 are well known to those skilled in the art, and thus are not repeated here for the sake of brevity.

Preferably, the cable telephony network 10' also includes a wireless telephone network (WTN) 42. The WTN 42, provides wireless communications between: (1) each TU 36' and telephone terminals 12*b* operated by customers of the WTN 42, and (2) between each TU 36' and telephones 12*b* operated by customers of the PSTN 30. The WTN 42 can be any type of terrestrial or satellite wireless telephone network including, but not limited to, Global System for Mobile Communications (GSM), time division multiple access (TDMA) and code division multiple access (CDMA) types of networks. The general structure and operation of wireless telephone networks are well known to those skilled in the art. Accordingly, the WTN 42 is not further described for the sake of brevity.

Figure 2:
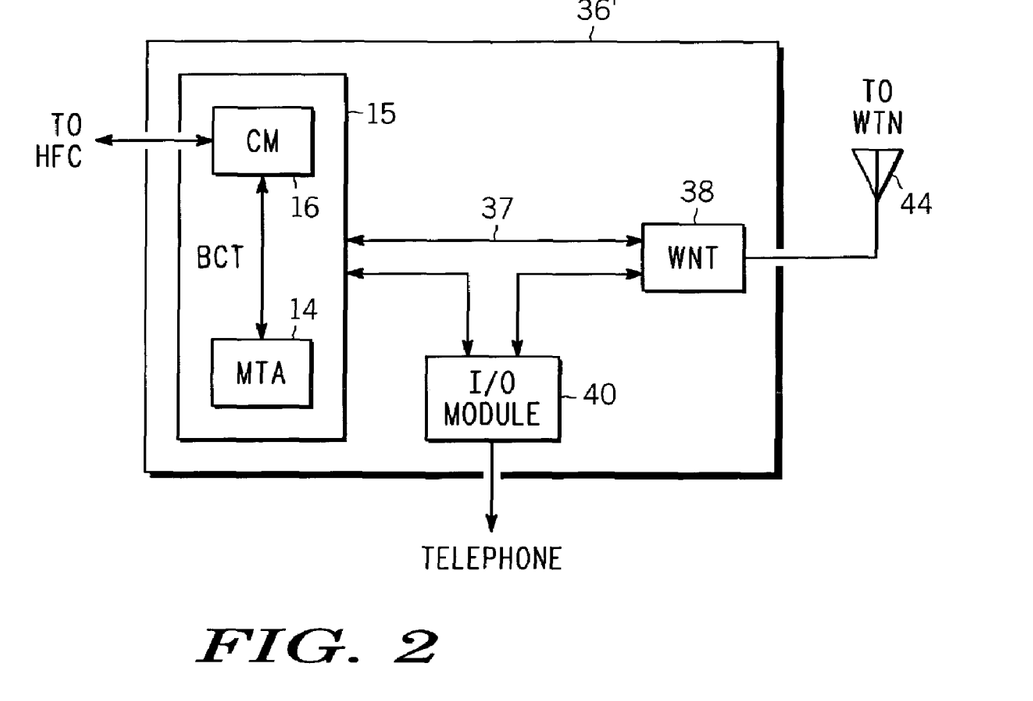
FIG. 2 is a functional block diagram of a terminal unit in accordance with a first preferred embodiment of the invention.

FIG. 2 shows a functional block diagram of the TU 36' for connecting the first telephone 12*a* to the BCS 50' and to the WTN 42. Preferably, the TU 36' includes a broadband cable transceiver (BCT) 15 for connecting the TU 36' to the broadband cable system 50'; a wireless network transceiver (WNT) 38 and an antenna 44 for connecting the TU 36' to the wireless telephone network 42; and an I/O module 40 for connecting the first telephone 12*a* to either the BCT 15 or the WNT 38.

Preferably, the BCT 15 includes a multimedia terminal adapter (MTA) 14. The MTA 14 has a customer side interface connecting the MTA 14 to customer's premises equipment (CPE) including the first telephone 12*a*, and a network side signaling interface connecting the MTA 14 to call control elements in the cable telephony network 10', e.g., the assigned call manager 26'. The MTA 14 also includes codecs and signaling and encapsulation functions required to transport signals to and from the first telephone 12*a* via the BCS 50'. Preferably, the MTA 14 supports standard voice over Internet protocol (VoIP) standards for processing incoming and outgoing calls to and from the first telephone 12*a* such as a Network-Based Call Signaling (NCS) protocol. However, other call signaling protocols such as, but not limited to, Media Gateway Control Protocol (MGCP) or Simple Gateway Control Protocol (SGCP) may be used by the MTA 14. The operation of the MTA 14 with respect to supporting communications between the first telephone 12*a* and the IP network 22 is substantially identical to that of a conventional MTA 14 used in known cable telephony networks. Accordingly, a further description of the structure and the operation of the MTA 14 is not repeated here, for the sake of brevity.

Preferably, the BCT 15 also includes a cable modem (CM) 16. The CM 16 provides a connection between the TU 36' and the CMTS 20' via the cable plant 18'. In the process of connecting to the CMTS 20', the CM 16 performs the well known functions of ranging and registering. The operation of the CM 16 is substantially identical to that of a conventional cable modem used in known broadband cable systems. Accordingly, a description of the structure and the operation of the CM 16 is not repeated here, for the sake of brevity.

Preferably, the CM 16 and the MTA 14 portions of the BCT 15 are constructed as a single integrated unit. Accordingly, functions described as being individually allocated to the CM 16 and the MTA 14 are allocated herein to the CM 16 and the MTA 14 only for the sake of clarity, and may be performed by either the CM 16 or the MTA 14 or a combination of the CM 16 and the MTA 14.

The WNT 38 contains a customer side interface for connecting the WNT 38 to customer premises equipment (CPE) including the first telephone 12*a*, and a wireless network side signaling interface for connecting the WNT 38 to call control elements in the WTN 42. The WNT 38 also includes codecs, signaling and encapsulation functions required to transport signals to and from the first telephone 12*a* via the WTN 42. The wireless network side of the WNT 38 supports signaling compatible with at least one of the GSM, TDMA or CDMA types of wireless communications protocols (or future developments of the aforementioned types of protocols) used by the various WTNs 42. The WNT 38 is also anticipated to be able to support VoIP protocols similar to those of the MTA 14, if wireless telephone networks migrate to the VoIP standards. The functions performed by the WNT 15 for providing communications via the WNT 38 are similar to those of a conventional wireless telephone terminal. Accordingly, a description of the conventional aspects of the WNT 38 are not described herein, for the sake of brevity.

The I/O module 40 transmits signals between the first telephone 12*a* and the BCT 15 when a first connection between the first telephone and the second telephone 12*b* is made via the broadband cable system 50', and transmits signals to and from the first telephone 12*a* and the WNT 38 when a second connection between the first telephone and the second telephone 12*b* is to be made via the WTN 42. Preferably, the I/O module is transparent to the electrical signals passing from the first telephone 12*a* to BCT 15 or to the WNT 38. The I/O module thus acts merely as a switch. However, the I/O module 40 could also provide functions that are included in the BCT 15 and WNT 38, such as the conversion of analog to digital signals and vice-versa.

The BCT 15 and the WNT 38 communicate with each other via a BCT/WNT interface 37, whereby the BCT 15 and the WNT 38 exchange control signals, including a "KEEP ALIVE" signal, which determines whether the BCT 15 or the WNT 38 is in control of the TU 36'. In the first preferred embodiment, the BCT 15 monitors the cable modem 16 to determine if the cable modem 16 is ranged and registered with the CMTS 20'. If the BCT 15 determines that the cable modem 16 is not ranged and registered with the CMTS 20' prior to the TU 36' establishing the first connection from the first telephone 12*a* to the second telephone 12*b* via the BCS 50', the BCT 15 signals the WNT 38 via the BCT/WNT interface 37 to assume control of the TU 36' and to attempt to provide the second connection via the WTN 42. The BCT 15 also monitors the cable modem 16 after the first connection via BCS 50' has been established, to determine if the cable modem 16 continues to be ranged and registered. If the BCT 15 determines that the cable modem is not ranged and registered during the first connection, the BCT 15 signals the WNT 38 via the BCT/WNT interface 37 to assume control of the TU 36' and to attempt to establish the second connection via the WTN 42 between the first telephone 12*a* and the second telephone 12*b*.

As described above, the cable telephony network 10' includes one or more call managers 26', each of which is typically assigned to a known set of customer telephone numbers. When originating a telephone call from the first telephone 12*a* to the second telephone 12*b*, the BCT 15 communicates, via the BCS 50', with the call manager 26' assigned to the originating TU 36'. If the BCT 15 is not able to communicate with the assigned call manager 26' over the BCS 50', due perhaps to a fault in the cable plant 18' or the CMTS 20', or if the BCT 15 determines that the assigned call manager 26' is inoperative, the BCT 15 signals the WNT 38 to assume control of the TU 36' and to attempt to connect with a different call manager (not shown) via the WTN 42 and to provide the second telephone 12*b* connection via the WTN 42. Once the first connection with the second telephone 12*b* is provided via the BCS 50', the BCT 15 monitors the status of the first connection between the TU 36' and the assigned call manager 26'. If the connection between the TU 36' and the assigned call manager 26 is lost during the first connection, due to a condition other than a hang-up by the first or the second telephone 12*b*, the BCT 15 signals the WNT 38 to assume control of the TU 36' and to attempt to provide the second connection via the WTN 42.

Preferably, the BCT 15 also communicates with the back end server 24' prior to providing a telephone connection from the first telephone to the second telephone 12*b* via BCS 50'. If the BCT 15 is not able to communicate with the back end server 24' over the BCS 50', the BCT 15 signals the WNT 38 to assume control of the TU 36' and to attempt to connect with the back end server 24' via the WTN 42 and then provide a second telephone 12*b* connection via the WTN 42. Once the first connection with the second telephone 12*b* is provided via the BCS 50', the BCT 15 monitors the status of the connection between the TU 36' and the back end server 24'. If the connection between the TU 36' and the back end server 24 is lost during the first connection, due to a condition other than a hang-up by the first or the second telephone 12*b*, the BCT 15 signals the WNT 38 to assume control of the TU 36' and to attempt to provide the second connection via the WTN 42.

The TU36' operates in a normal mode wherein the TU36' connects the telephone 12*a* to the BCS 50', and a backup mode wherein the TU36' connects the telephone 12*a* to the WNT 38. The terminal unit is operative in a normal mode when BCT 15 is functional and is able to establish a communications path via the BCS 50', and is operative in a backup mode when the BCT 15 is determined not to be functional or is unable to establish the communications path via the BCS 50'. Preferably, the TU 36' determines whether to attempt to provide the first connection or the second connection between the first telephone 12*a* and the second telephone 12*b* based on whether the TU 36' is in the normal mode or in the backup mode. In the normal mode, the telephone connection is established through the BCS 50' and the BCT 15 controls the operation of the TU 36. Accordingly, when the TU 36' is in the normal mode, the BCT 15: (1) instructs the WNT 38 to be in a standby condition in which the WNT 38 may receive a telephone call via the WTN 42, but telephone calls originated by the first telephone 12*a* are routed via the BCS 50', and (2) instructs the I/O module 40 to connect the first telephone 12*a* to the BCT 15 for initiating the first telephone connection via the BCS 50' and for receiving telephone calls via the BCS 50'. Calls received by the WNT 38 while the TU 36' is in the normal mode cause the TU 36' to assume the backup mode, as described below. In the backup mode, the WNT 38 assumes control of the TU 36', and instructs the I/O module 40 to connect the first telephone 12*a* to the WNT 38 for receiving the telephone call via the WTN 42 and for originating a second telephone connection via the WTN 42.

Figure 3:
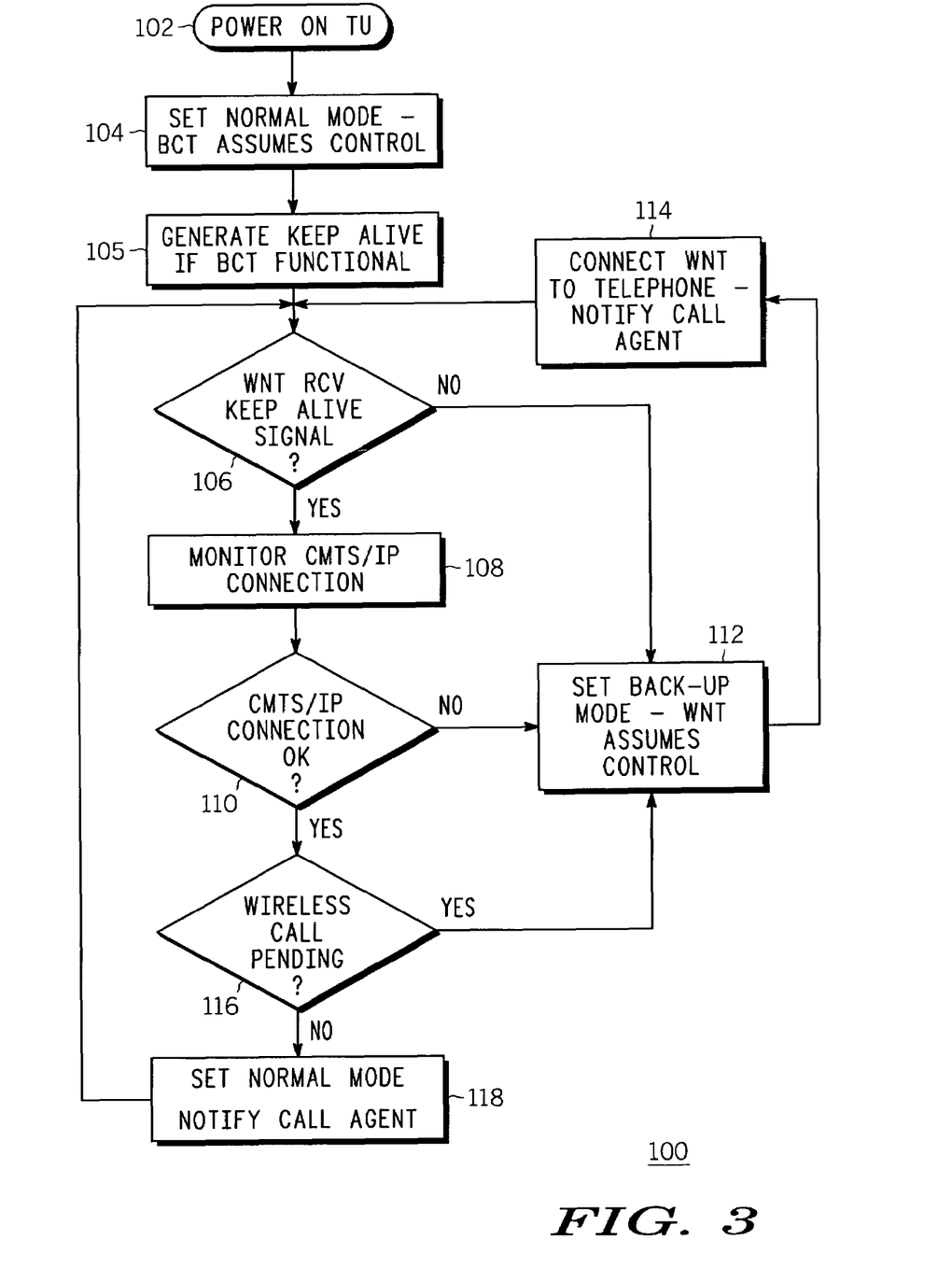
FIG. 3 is a flow diagram of a process for setting a mode of the terminal unit shown in FIG. 2.

FIG. 3 depicts a process 100 for determining a mode of the TU 36' in accordance with the first preferred embodiment. When the TU 36' is powered on (step 102), the TU 36' is set to the normal mode (step 104) in which the BCT 15 assumes control of the TU 36' and the BCT 15 causes the I/O module 40 to connect the telephone 12*a* to the BCT 15. The BCT 15 periodically performs a self-test routine, and if the self-test routine determines that the BCT 15 is fully operational, the BCT 15 generates an "I AM ALIVE" message (step 105) which is transmitted to the WNT 38 over the BCS/WNT interface 37 and is monitored by the WNT 38. If the "I AM ALIVE" message is received by the WNT 38 within a predetermined time interval (step 106), the BCT 15 is assumed to be operational. If the "I AM ALIVE" message is not received by the WNT 38 within the predetermined time interval (step 106), the TU 36 is set to the backup mode (step 112) in which the BCT 15 relinquishes control of the TU 36' to the WNT 38. The WNT 38 then commands the I/O module 40 to connect the first telephone 12*a* to the WNT 38, and notifies the call manager 26' assigned to the WNT 38 via the WTN 42 that the TU 36' is in the backup mode and that telephone calls from the second telephone 12*b* to the TU 36' are to be routed via the WTN 42 (step 114).

If the BCP 15 is determined to be operational (step 106), the BCT 15 monitors the status of communications of the TU 36' with the BCS 50' and with the IP network 22. The BCT 15 monitors the CM 16 to determine if the cable modem is ranged and registered with the CMTS 20' (step 108). If the CM 16 is not ranged and registered (step 110), the BCT 15 signals the WNT 38 to set the TU 36' into the backup mode (step 112) in which the WNT 38: (1) assumes control of the TU 36', (2) connects the WNT 38 to the first telephone 12*a*, and (3) notifies the call manager 26' assigned to the WNT 38 that the TU 36' is in the backup mode (step 114).

If the CM 16 is ranged and registered (step 110), the BCT 15 checks to see if the TU 36' is able to communicate via the BSC 50' with the call manager 26' assigned to BCT 15 and to the back end server 24'. If the TU 36' is able to communicate with the call manager 26' assigned to the BCT 15 and to the back end server 24', the BCT 15 checks the status of the WNT 38 over the BCS/WNT interface 37 to determine if an incoming wireless call via the WTN 42 is pending in the WNT 38 (step 116). If a wireless call is not pending, the TU 36' is set to the normal mode (step 118), the call manager 26' is notified that the TU 36' is in the normal mode and steps 106-118 are repeated. If the TU 36' is not able to communicate with the call manager 26' or the back end server 24', or the call manager 26', or the back end server 24' indicates an inoperative status, or a wireless call is pending, the TU 36' enters the backup mode (step 112) in which the WNT 38: (1) assumes control of the TU 36', (2) connects the WNT 38 to the first telephone 12*a* and (3) notifies the call manager 26' assigned to the WNT 38 that the TU 36' is in the backup mode (step 114). Where an incoming wireless call was found pending in the WNT 38, a ringing tone is passed to the telephone 12*a* when the TU 36' enters the backup mode. Other methods for determining connectivity of the TU 36' though the BCS 50' may be utilized in addition to the aforementioned, including but not limited to processing signals from the fault management system 34'.

Steps 105-116 are continually executed whether the TU 36' is in the normal mode or in the backup mode, such that the TU 36' is always reset to the normal mode if the communications path via the BCS 50' becomes available. The user of the first telephone 12*a* may force the TU 36' into the backup mode by appropriately signaling the TU 36' in order to purposely place a call via the wireless telephone network 42.

Figure 4:
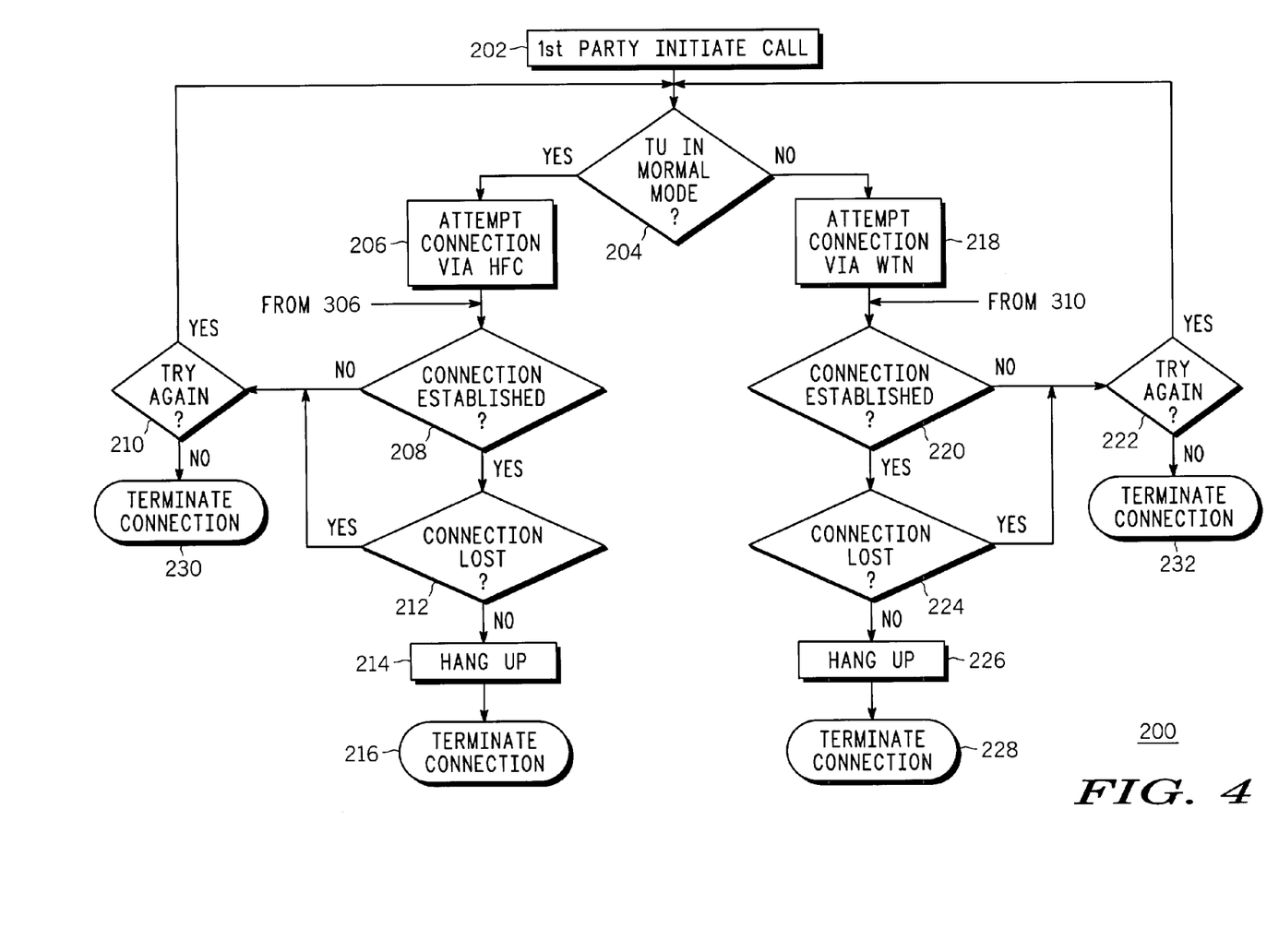
FIG. 4 is a flow diagram of a process for providing a telephone connection between a first telephone and a second telephone when a telephone connection is initiated by the first telephone.

FIG. 4 depicts a preferred process 200 for providing a connection from a first telephone 12*a* connected to the TU 36', to a second telephone 12*b* which is connected to the PSTN 30, the WTN 42, the BCS 50' or to another broadband cable system (not shown), when the first connection is initiated by a user of the first telephone 12*a*. At step 202, the user of the first telephone 12*a* takes the first telephone 12*a* off-hook. At step 204, the TU 36' detects the off-hook condition and determines whether to initiate the telephone connection via the BCS 50' or via the WTN 42 based on whether the TU 36' is in the normal mode or in the backup mode. If the TU 36' is in the normal mode, the TU 36' attempts to provide a connection over the BCS 50' (step 206). If the connection is not provided over the BCS 50' (step 208) or if the connection is lost after it is provided (step 212), the user of the first telephone 12*a* is alerted by a voice query and asked if the connection should again be attempted (step 210). If the user of the first telephone 12*a* responds with a voice utterance so as to reinitiate the connection, the preceding process repeats starting at step 204. If the connection via the BCS 50' has not been provided or lost, the TU 36', by the preceding process, attempts to provide the connection over the WTN 42. If the user of the first telephone 12*a* chooses not to reinitiate the connection over the WTN 42 by hanging up, the connection is terminated (step 230). If the user of the first telephone 12*a* hangs up during the connection, the connection is terminated (steps 214 and 216).

If, at step 204, the TU36' is determined to not be in the normal mode (i.e. the TU36' is in the backup mode), the connection with the second telephone 12*b* is attempted over the WTN 42 (step 218). If the connection is not provided over the WTN (step 220) or the connection is lost after it is provided (step 230), the user of the first telephone 12*a* is alerted by a voice query and asked if the connection should again be initiated (step 222). If the user of the first telephone 12*a* responds by uttering a positive response so as to reinitiate the connection, the preceding process repeats, starting at step 204. If the user of the first telephone 12*a* chooses not to reinitiate the connection by hanging up, the connection is terminated (step 232). If the first telephone 12*a* is hung up during the connection, the connection is terminated (steps 226 and 228). Means other than voice queries and responses may be used for directing the above processes, such as a tone signaling and a keypad press.

Figure 5:
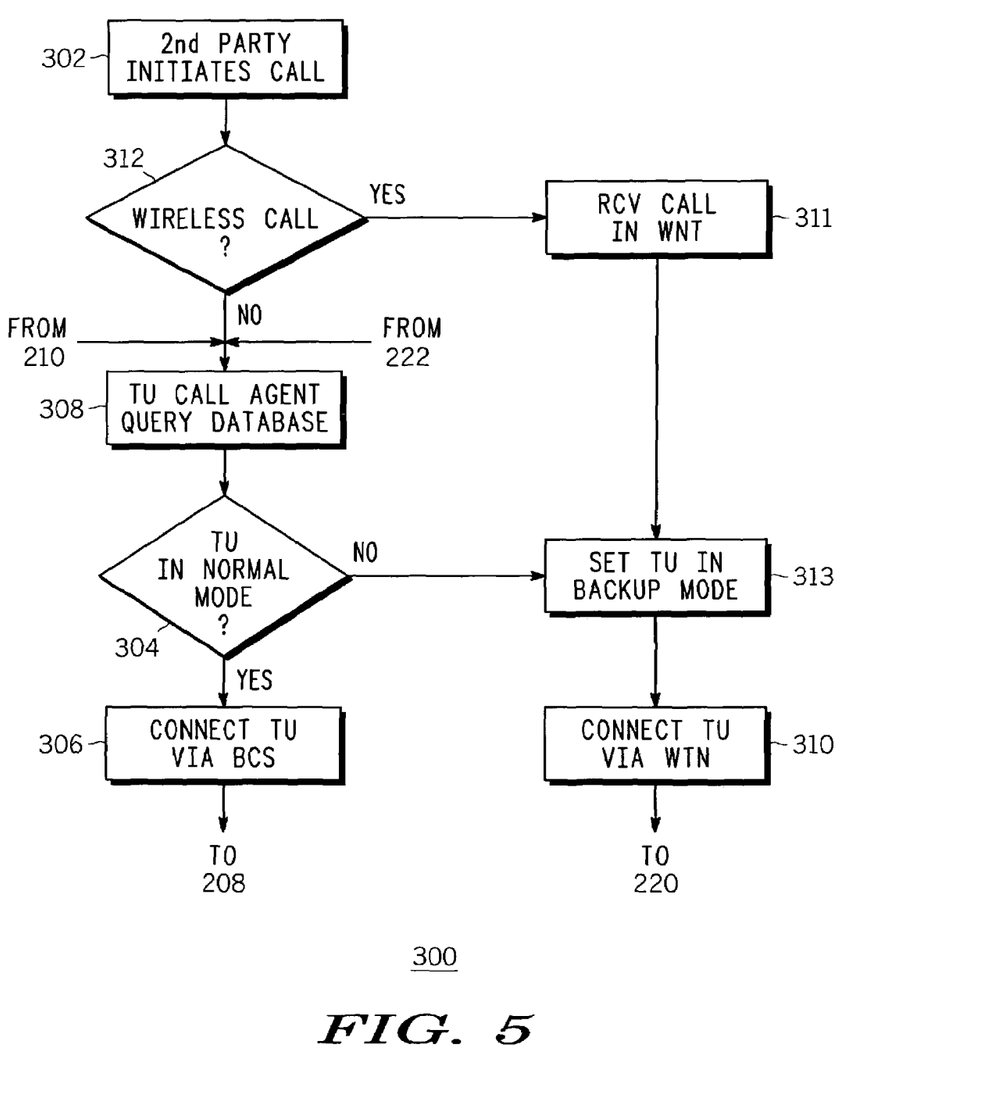
FIG. 5 is a flow diagram of a process for providing the telephone connection between the first telephone and the second telephone when the telephone connection is initiated by the second telephone.

FIG. 5 shows a flow diagram of a preferred process 300 for providing a connection between a first telephone 12*a* connected to the TU 36', and a second telephone 12*b* connected to either the PSTN 30, the WTN 42, the BCS 50' or to another broadband cable system, when the connection is initiated by the second telephone 12*b* (step 302). At step 312, the call manager 26' assigned to the second telephone 12*b* routes the telephone call for a connection via the WTN 42 or via the BCS 50', depending on the dialed telephone number. If the call is routed for a connection via the BCS 50', the call manager 26' assigned to the TU 36' queries its database (step 308) to determine whether the TU 36' is in the normal mode or in the backup mode (see steps 114 and 116 of FIG. 3A where the assigned call manager 26' has been notified by the TU 36' of its status). At steps 306 and 310, the TU 36' completes the connection via the BCS 50' (step 306) or via the WTN 42 (step 310) depending upon whether the TU 36' is in the normal mode or the backup mode. If the call from the second telephone 12*b* is received by the WNT 38 (step 311) via the wireless telephone network 42, the WNT 38 sets the TU 36' into the backup mode (step 313) and the TU 36' completes the connection via the WTN 42. The connection is then processed starting with step 208 or with step 220 depending on whether the connection has been initiated over the BCS 50' or over the WTN 42, in a manner similar to that of a connection initiated by the first telephone.

FIG. 1 further shows a second preferred embodiment of the cable telephony network 10' wherein the first device is a broadband test point 32 and the second device is the fault management system 34'. Preferably, each BTP 32 communicates with the fault management system 34' via the BCS 50' if communications between the BTP 32 and the fault management system 34' can be provided via the BCS 50'. If communications between the BTP 32 and the fault management system 34' cannot be provided via the BCS 50', or communications between the BTP 32 and the fault management system 34 via the BCS 50' are lost after having been provided, the BTP 32 communicates with the fault management system 34' via the wireless telephone network 42.

Figure 6:
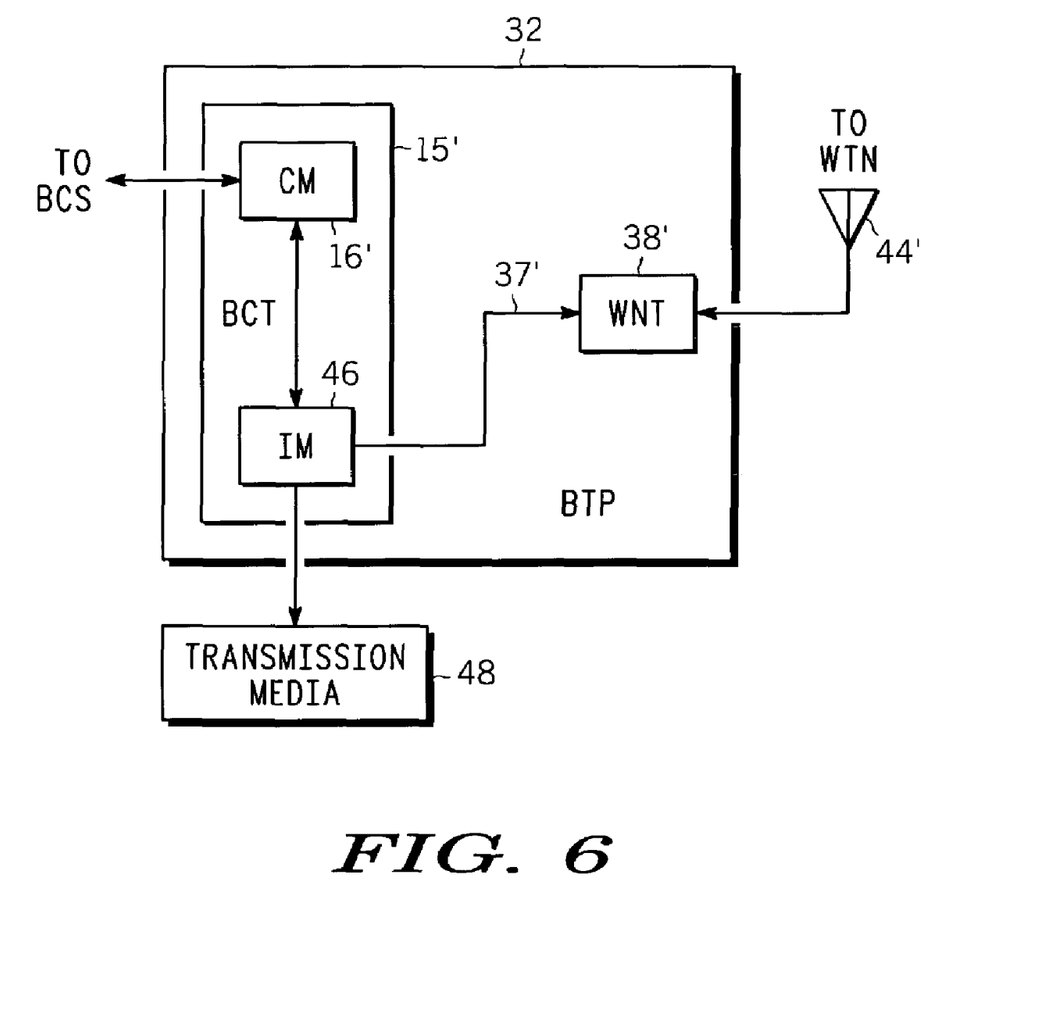
FIG. 6 is a functional block diagram of a broadband test point in accordance with a second preferred embodiment of the present invention.

Preferably, as shown in FIG. 6, each BTP 32 comprises a broadband cable transceiver (BCT) 15' and a wireless network transceiver (WNT) 38'. Preferably, the BCT 15' includes a cable modem (CM) 16' for providing a connection between the BTP 32 and the CMTS 20' via the BCS 50'. In the process of connecting to the CMTS 20', the CM 16' performs the well known functions of ranging and registering. The operation of the CM 16' is substantially identical to a conventional cable modem used in broadband cable systems. Accordingly, a description of the structure and the operation of the CM 16' is not repeated here, for the sake of brevity.

Preferably, the BCT 15' also includes an instrumentation module (IM) 46 attached to shared transmission media 48 of the of the cable plant 18'. The IM 46 monitors signals incident on the shared transmission media 48 and determines a value of performance parameters such as error rates, noise level, power level etc. characteristic of upstream and downstream signals incident on the shared transmission media 48. The IM 46 temporarily stores the values of the performance parameters and communicates the values of the performance parameters to the fault management system 34' as described below. Preferably, the IM 46 and the CM 16', are constructed as a single integrated unit. The CM 16' and the IM 46 could, however, be constructed as separate units.

Preferably, the BTP 32 also includes a wireless network transceiver (WNT) 38', and an antenna 44', for providing wireless communications between the BTP 32 and the fault management system 34' via the WTN 42. The WNT 38' and the IM 46 communicate via an IM/WNT interface 37'. The side of the WNT 38' connected to the WTN 42 is a wireless interface compatible with the frequency assignments, modulations and communications protocols (or future developments of the aforementioned types of frequency assignments, modulations and protocols) used by the various WTNs 42.

Preferably, the BTP 32 operates in either a normal mode or a backup mode. In the normal mode, that is, when it is possible for the BCT 15' to communicate with the fault management system 34' via the BCS 50', the BCT 15' controls the operation of the BTP 32 and the BTP 32 communicates with the fault management system 34' via the BCS 50'. Accordingly, in the normal mode, the BCT 15' instructs the WNT 38' to be in a standby condition in which the WNT 38' does not communicate the values of the performance parameters to the fault management system 34' via the WTN 42 but can receive messages from the fault management system 34' via the WTN 42. In the backup mode, the WNT 38' assumes control of the BTP 32, wherein the WNT 38' both transmits and receives messages to the fault management system 34'.

Figure 7:
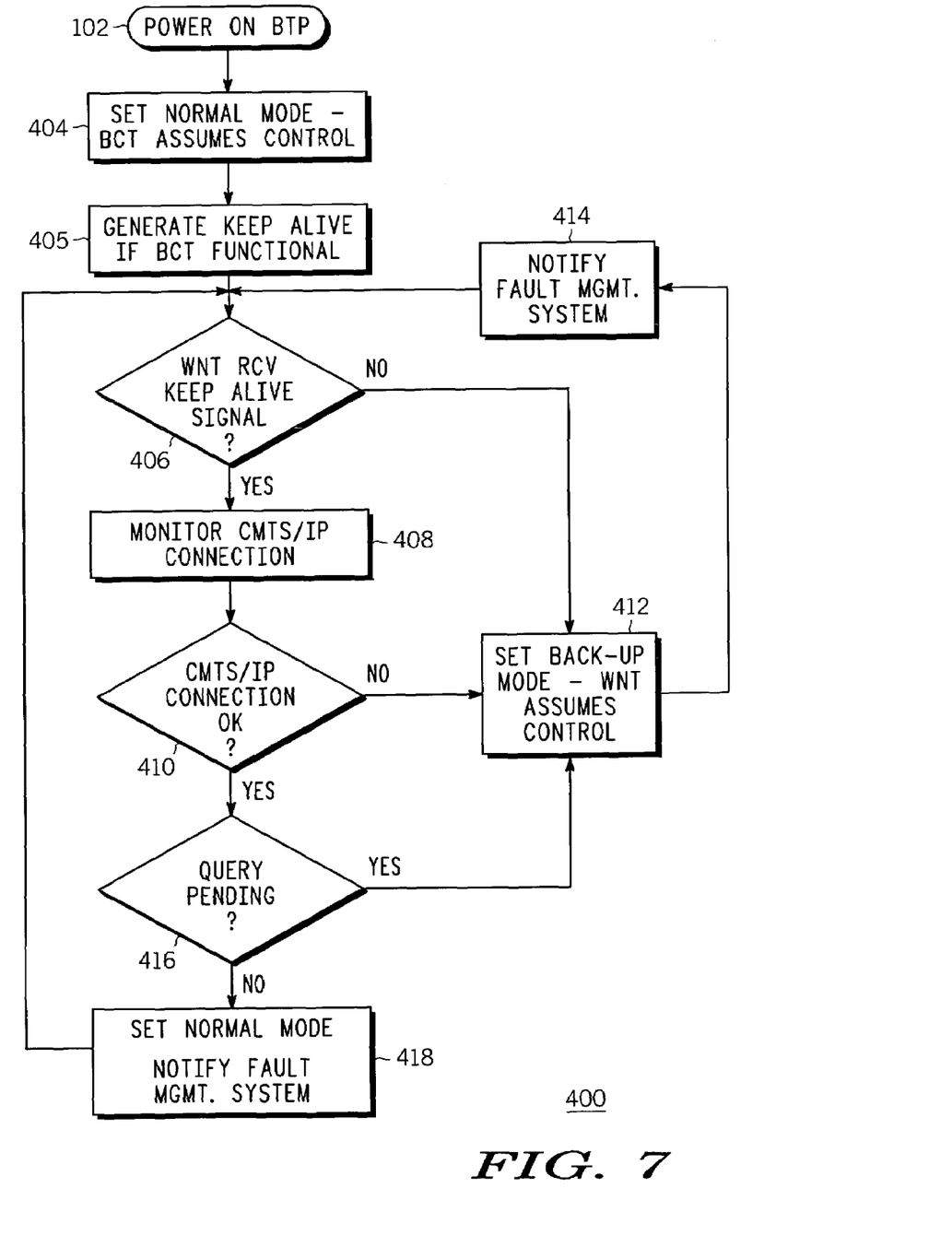
FIG. 7 is a flow diagram of a process for setting a mode of the broadband test point shown in FIG. 4.

FIG. 7 depicts a preferred process 400 for setting a mode of the BTP 32. When the BTP 32 is powered on (step 402), the BTP 32 is set to the normal mode (step 404) whereby the BCT 15' is in control of the BTP 32 and the WNT 38' is put in a standby state. The BCT 15' performs a periodic self-test routine, and if the self-test routine determines that the BCT 15' is fully operational, the BCT 15' generates an "I AM ALIVE" message (step 405) which is transmitted to the fault management system 34' via the BSC 50' indicating that the BTP 32 is in the normal mode. The "I AM Alive" message is also transmitted to the WNT 38' via the BCT/WNT interface 37'. If the "I AM ALIVE" message is received by the WNT 38' (step 406) within a predetermined time interval, the BCT 15' is assumed to be functional. If the "I AM ALIVE" message is not received by the WNT 38' within the predetermined time interval (step 406), the BTP 32 is set to a backup mode (step 412) and the BCT 15' relinquishes control of the BTP 32 to the WNT 38'. When the BTP 32 enters the backup mode, the WNT 38' notifies the fault management system 34' (step 414), via the WTN 42, that the BTP 32 is in the backup mode.

During the time that the BCP 15' is operational, the BCT 15' monitors the status of communications of the BTP 32 with the BCS 50' and with the IP network 22 (steps 408 and 410). The BCT 15' monitors the CM 16' to determine if the cable modem is ranged and registered with the CMTS 20'. If the CM 16' is not ranged and registered, the BCT 15' signals the WNT 38' to set the BTP 32 into the backup mode (step 412) wherein the WNT 38' assumes control of the BTP 32 and notifies the fault management system 34' that the BTP 32 is in the backup mode (step 414).

If the CM 16 is ranged and registered, the BCT 15, at steps 408 and 410, checks to see if the BTP 32 is able to communicate with the fault management system 34' via the BSC 50'. If the BTP 32 is not able to communicate with the fault management system 34', the BCT 15' causes the BTP 32 to revert to the backup mode and signals the WNT 38' to assume control of the BTP 32 and to notify the fault management system 34' that the BTP 32 is in the backup mode (step 414). Other measures of connectivity may be utilized in addition to the aforementioned, including but not limited to processing signals from the fault management system 34'.

If the TU 36' is able to communicate with the fault management system 34', the BTP 32 checks the status of the WNT 38' to determine if a message from the fault management system 34' transmitted via the WTN 42 is pending in the WNT 38' (step 416). If a message is not pending, the TU 36' is set to the normal mode (step 418), the fault management system 34' is notified that the TU 36' is in the normal mode and steps 406-418 are repeated. If a message is pending, the BTP 32 enters the backup mode wherein the message from the fault management system 34' may be received by the BTP 32. Steps 405-418 are continually executed whether the BTP 32 is in the normal mode or in the backup mode, such that the BTP 32 is always reset to the normal mode if the communications path from the BTP 32 to the fault management system 34' via the BCS 50' becomes available.

Preferably, the BTP 32 communicates with the fault management system 34' using Simple Network Management Protocol (SNMP) protocol. The fault management system 34' periodically issues Simple Network Management Protocol (SNMP) commands to each BTP 32 in order to read the values of the performance parameters stored in the instrumentation module 46. Additionally, the BCT 15' generates an unsolicited trap message to the fault management system 34' when the monitoring device 32 detects an alarm condition on the shared transmission media 48. Accordingly, the fault management system 34' queries the BTP 32 via the BCS 50' when the BTP 32 is in the normal mode and queries the BTP 32 via the WTN when the BTP 32 is in the backup mode. Similarly, when the BTP 32 is in the normal mode, the BTP 32 responds to the query from the fault management system 34' by transmitting the performance parameters stored in the IM 46 via the BCS 50', and transmits the unsolicited trap message to the fault management system 34' via the BCS 50'. When the BTP 32 is in the backup mode, the BTP 32 responds to the query from the fault management system 34' by transmitting the performance parameters stored in the IM 46 via the WTN 42 and transmits the unsolicited trap message to the fault management system 34' via the WTN 42.

From the foregoing description it can be seen that the present invention comprises a cable telephony network and apparatus by which a communications path may be established between a first and a second telephone or between a broadband test point and a fault monitoring system via either a broadband cable system or a wireless telephone network whereby a backup communications path provided by the alternate communications path established by the wireless telephone network leads to a enhanced availability of the cable telephony network and a reduced quantity of redundant components in the network to support broadband cable telephony.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A terminal unit for selectively connecting a telephone to a broadband cable system and to a wireless telephone network to enable telephone communications between the telephone and another device, the terminal unit comprising:
   a broadband cable transceiver connecting the telephone to the broadband cable system;
   a wireless network transceiver connecting the telephone to the wireless telephone network; and
   an input/output module which transmits signals between the telephone and the broadband cable transceiver when the terminal unit is transmitting the telephone communication through the broadband cable system and which transmits signals between the telephone and the wireless network transceiver when transmitting the telephone communication through the wireless network,
   wherein the telephone uses dual tone multiple frequency signaling or pulse signaling for communications.

2. The terminal unit according to claim 1, the broadband cable transceiver including a cable modem, wherein the broadband cable transceiver periodically monitors the status of the cable modem to determine if the cable modem is ranged and registered and signals the wireless network transceiver to connect the telephone to the wireless telephone network if the cable modem is not ranged and registered.

3. The terminal unit according to claim 1, wherein the broadband cable transceiver periodically communicates with a call manager via the broadband cable system and signals the wireless network transceiver to connect the telephone to the wireless telephone network if the broadband cable transceiver is unable to communicate with the call manager via the broadband cable system or if the call manager is determined to be inoperative.

4. The terminal unit according to claim 1, wherein the broadband cable transceiver periodically communicates with a back end server via the broadband cable system and signals the wireless network transceiver to connect the telephone to the wireless telephone network if the broadband cable transceiver is unable to communicate with the back end server via the broadband cable system or if the back end server is determined to be inoperative.

5. The terminal unit according to claim 1, the terminal unit further including an input/output module, the input/output module connecting the telephone to the broadband cable transceiver when the telephone is to be connected to the broadband cable system and connecting the telephone to the wireless network transceiver when the telephone is to be connected to the wireless telephone network.

6. The terminal unit according to claim 1, wherein the broadband cable transceiver periodically generates a keep-alive signal, the wireless network transceiver receiving the keep-alive signal and connecting the telephone to the wireless telephone network if the keep-alive signal is not received.

7. A terminal unit for connecting a telephone to a broadband cable system and a wireless telephone network, the terminal unit being operative in a normal mode and a backup mode, the terminal unit comprising:
   a broadband cable transceiver;
   a wireless network transceiver; and
   an input/output module which transmits signals between the telephone and the broadband cable transceiver when the terminal unit is transmitting the telephone communication through the broadband cable system and which transmits signals between the telephone and the wireless network transceiver when transmitting the telephone communication through the wireless network,
   wherein the terminal unit connects the telephone to the broadband cable system via the broadband cable transceiver when the terminal is operative in the normal mode and connects the telephone to the wireless telephone network via the wireless network transceiver when the telephone is in the backup mode,
   wherein the telephone uses dual tone multiple frequency signaling or pulse signaling for communications.

8. The terminal unit according to claim 7, wherein the terminal unit is operative in the normal mode when the broadband cable transceiver is functional and is able to establish a communications path via the broadband cable system and is operative in the backup mode when the broadband cable transceiver is determined not to be functional or is unable to establish the communications path via the broadband cable system.

9. A method for providing a first telephone connection and a second telephone connection between a first telephone and a second telephone, the first telephone being connected to a broadband cable system for providing the first connection and being connected to a wireless telephone network for providing the second connection, the method comprising the steps of:
   attempting to provide the first telephone connection via the broadband cable system; and
   attempting to provide the second telephone connection via the wireless telephone network if the first telephone connection is not first provided via the broadband cable system,
   wherein both the first telephone connection and the second telephone connection are through an input/output module which transmits signals between the telephone and the broadband cable transceiver when the terminal unit is transmitting the telephone communication through the broadband cable system and which transmits signals between the telephone and the wireless network transceiver when transmitting the telephone communication through the wireless network, and
   wherein the telephone uses dual tone multiple frequency signaling or pulse signaling for communications.

10. The method of claim 9, wherein the second telephone is connected to the public switched telephone network.

11. The method of claim 9, wherein the second telephone is connected to the wireless telephone network.

12. The method of claim 9, wherein second telephone is connected to the broadband cable system or to a different broadband cable system.

13. The method according to claim 9, wherein a terminal unit having a cable modem is connected to the broadband cable system and to the wireless telephone network, the method further comprising the steps of determining whether the cable modem is ranged and registered before attempting to provide the first telephone connection via the cable telephony network, and if so, attempting to provide the second telephone connection via the wireless telephone network if the cable modem is not ranged and registered.

14. The method according to claim 9, wherein a terminal unit is connected to the broadband cable system and to the wireless telephone network, the method further comprising the steps of the terminal unit attempting to communicate with a call manager via the broadband cable system prior to providing the first telephone connection, and if so, attempting to provide the second telephone connection via the wireless telephone network if the terminal unit is unable to communicate with the call manager.

15. The method according to claim 9, wherein a terminal unit is connectable to the broadband cable system and to the wireless telephone network, the method further comprising the steps of the terminal unit attempting to communicate with the back end server via the broadband cable system prior to attempting to provide the first telephone connection, and if so, attempting to provide the second telephone connection via the wireless telephone network if the terminal unit is unable to communicate with the back end server.

16. A method for providing a first telephone connection and a second telephone connection between a first telephone and a second telephone, the first telephone being connected to a broadband cable system for providing the first connection and being connected to a wireless telephone network for providing the second connection, the method comprising the steps of:
providing the first telephone connection between the first telephone and the second telephone via a broadband cable system; and
attempting to provide the second telephone connection between the first telephone and the second telephone via the wireless telephone network if the first telephone connection via the broadband cable system is lost,
wherein both the first telephone connection and the second telephone connection are through an input/output module which transmits signals between the telephone and the broadband cable transceiver when the terminal unit is transmitting the telephone communication through the broadband cable system and which transmits signals between the telephone and the wireless network transceiver when transmitting the telephone communication through the wireless network, and
wherein the telephone uses dual tone multiple frequency signaling or pulse signaling for communications.

17. The method of claim 16, wherein the second telephone is connected to the public switched telephone network.

18. The method of claim 16, wherein the second telephone is connected to the wireless telephone network.

19. The method of claim 16, wherein the second telephone is connected to the broadband cable system or to a different broadband cable system.

20. The method according to claim 16, wherein a terminal unit including a cable modem is connectable to the broadband cable system and to the wireless telephone network, the method further comprising the steps of determining if the cable modem is ranged and registered during the first telephone connection, and if so, attempting to provide the second telephone connection via the wireless telephone network if the cable modem is not ranged and registered.

21. The method according to claim 16, wherein a terminal unit is connectable to the broadband cable system and to the wireless telephone network, and wherein the first telephone communicates with the call manager prior to providing the telephone connection via the broadband cable network, the method further comprising the steps of determining if the communications with the call manager are lost during the first telephone connection, and if so, attempting to provide the second telephone connection via the wireless telephone network if the communications with the call manager are lost.

* * * * *

UNITED STATES PATENT AND TRADEMARK OFFICE
CERTIFICATE OF CORRECTION

PATENT NO. : 7,356,348 B2  Page 1 of 1
APPLICATION NO. : 10/322364
DATED : April 8, 2008
INVENTOR(S) : Bifano et al.

It is certified that error appears in the above-identified patent and that said Letters Patent is hereby corrected as shown below:

In the drawing:
In Fig. 1, Sheet 1 of 8, please delete Tag "26" and insert Tag --26'--

In Fig. 1, Sheet 1 of 8, delete " " and insert -- --

Signed and Sealed this

Seventeenth Day of November, 2009

David J. Kappos
*Director of the United States Patent and Trademark Office*